Nov. 18, 1930.  D. L. THOMAS  1,781,826
PROCESS OF TREATING HYDROCARBONS
Filed July 23, 1927  2 Sheets-Sheet 1
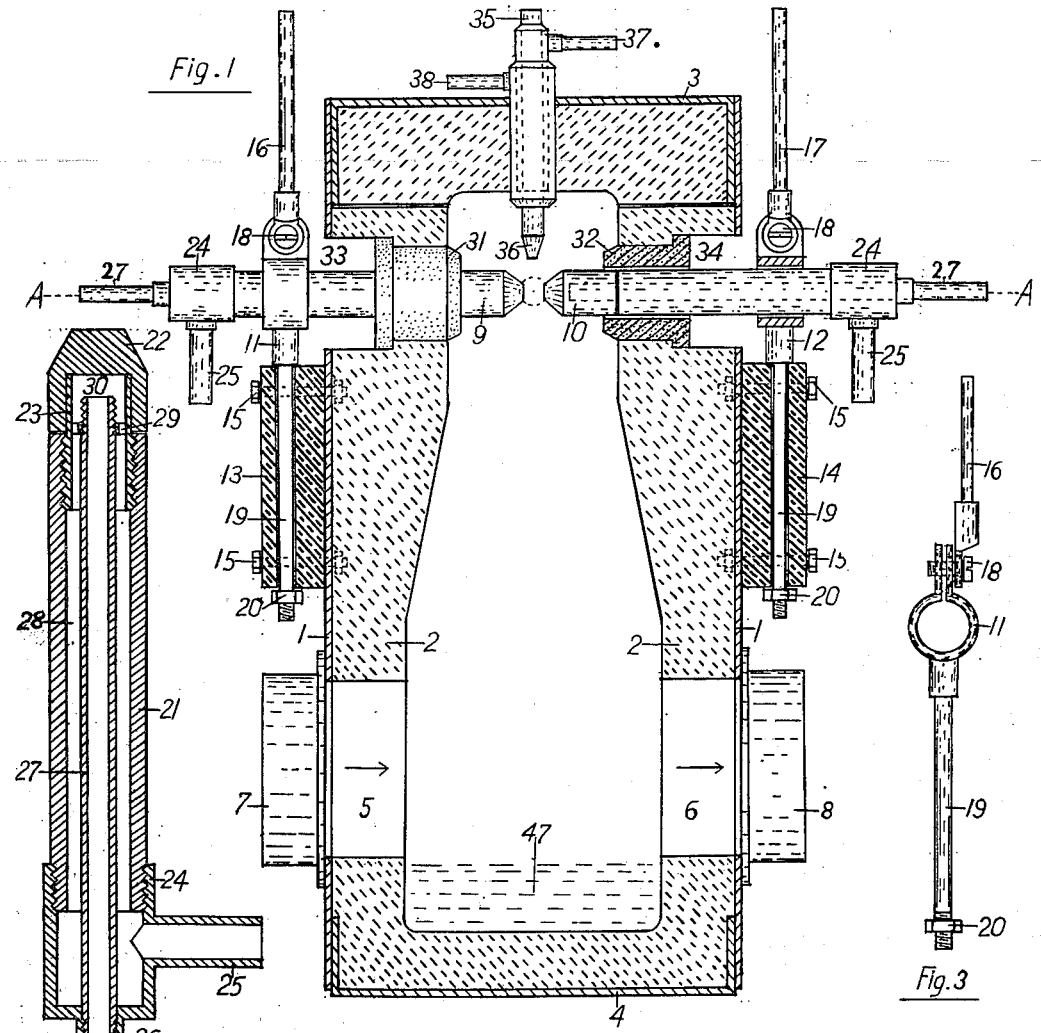
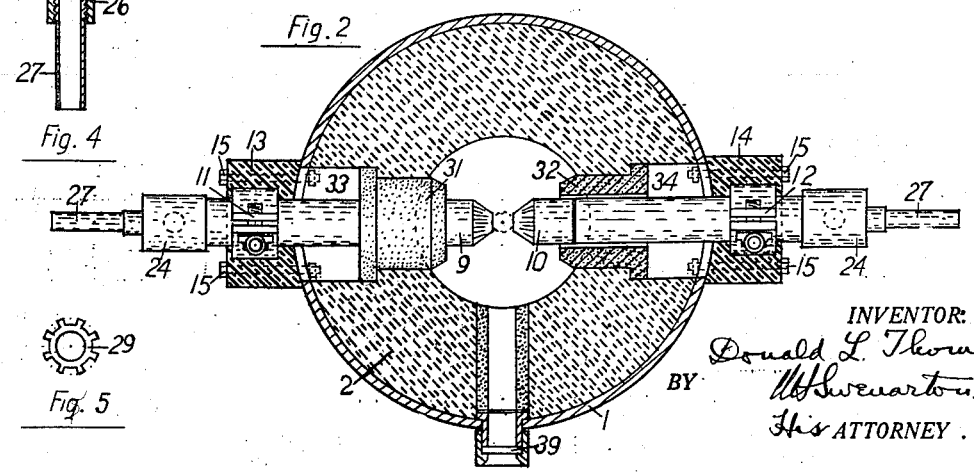
INVENTOR:
Donald L. Thomas,
BY
His ATTORNEY.

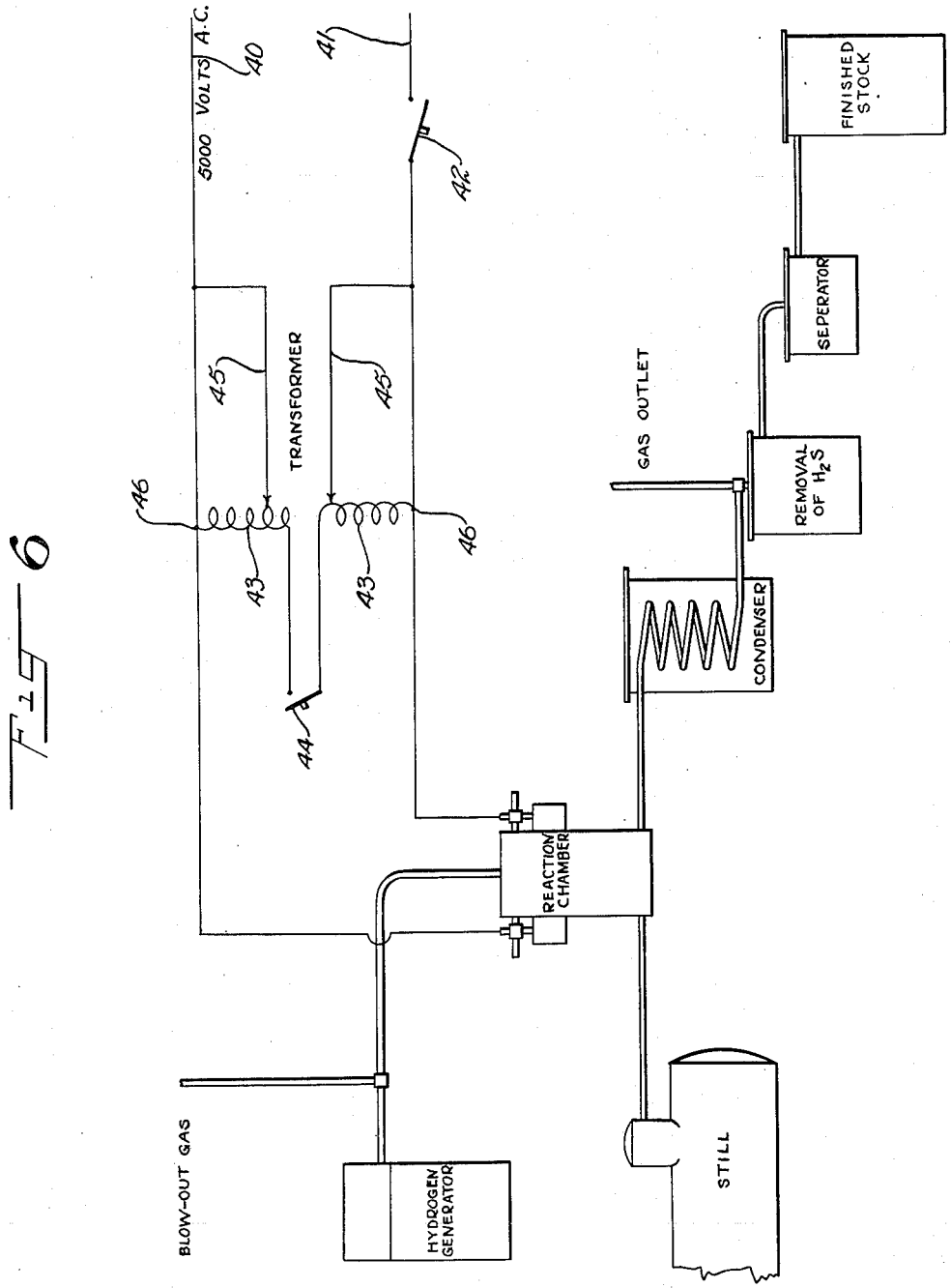

Patented Nov. 18, 1930

1,781,826

UNITED STATES PATENT OFFICE

DONALD L. THOMAS, OF NEW YORK, N. Y.

PROCESS OF TREATING HYDROCARBONS

Application filed July 23, 1927. Serial No. 207,850.

This invention relates to the treatment of hydrocarbons such as petroleum oils so as to, decolorize, deodorize, and desulphurize such oils in order to fit them for commercial use.

Such products are usually—prior to refining—contaminated with certain sulphur compounds, gums, resinous material or other deleterious matter which is objectionable. Normally these impurities are removed by refining treatments, either by redistillation, acid and basic treatments, or innumerable types of filtering. The objectionable products most difficult to remove seem to be certain of the sulphur compounds which are combined with the hydrocarbon products so that repeated treatments by different refining materials are oftentimes ineffectual in reducing the hydrocarbons to a proper marketable condition.

By the present invention the whole or a part of the sulphur present in an oil may be eliminated as sulphureted hydrogen by heating the oil in presence of hydrogen or a gas containing hydrogen.

In the practice of my invention a new principle is utilized, namely, the dissociation of molecular hydrogen to form a new and extremely reactive variety of hydrogen termed "atomic hydrogen". Hydrogen in this form is capable of reacting even in the cold with sulphur, arsenic, and phosphorus converting them into their corresponding hydrides. Oleic acid and other unsaturated hydrocarbons are hydrogenated more or less while ethylene, carbon-monoxide, and oxygen react readily with this active form of hydrogen.

In the presence of certain metals such as tungsten, platinum, palladium, nickel, etc., the atomic hydrogen is rapidly converted back to the molecular state with the evolution of large volumes of heat.

It is known that when vapor of oil containing sulphur is heated with hydrogen an elimination of sulphur as sulphureted hydrogen occurs, nascent hydrogen is particularly effective in this respect, and in one process which takes advantage of this fact the hydrogen is produced by mixing the oil vapor with superheated steam and passing the mixture over coke heated to redness, the coke at the same time producing intimate contact between the steam and the oil, which is cracked at the temperature used.

The active reducing character of atomic hydrogen, however, is a new property for which no analogy exists in the use of molecular hydrogen.

In its broader aspects therefore the invention consists in utilizing this new property of atomic hydrogen to effect the complete reduction and elimination of sulphur compounds from hydrocarbons by reacting on such compounds with atomic hydrogen, either in the cold, or as seems preferable, at an elevated temperature.

The process appears to be applicable to all oils containing sulphur. The most efficient temperature of working is in the region of 400 to 500 degrees centigrade for at this temperature range the velocity of the reaction is so high that only a relatively short time of contact is required.

Reaction is preferably carried out in the vapor phase, the oils being vaporized previous to mixture with the atomic hydrogen, certain oils, however, are decomposed when heated alone to a temperature sufficient to vaporize them. In these cases I may use a gaseous medium to assist the vaporization provided I use non-oxygen containing gases and vapors. Steam and oxygen containing gases and vapors act somewhat similar to catalytic poisons when mixed with atomic hydrogen and hinder to a greater or less extent the reactions in which it takes part. The presence of aqueous vapor or oxygen should therefore preferably be avoided in the operation of the process.

Certain substances, it is well known, act catalytically in promoting the decomposition of sulphur compounds, nickel, iron, cobalt, copper, and numbers of other substances deposited in porous nuclei or used as such, may be regarded as catalysts to the decomposition, while such substances as pumice, fire clay, asbestos, etc., appear only to act as promoting contact and are termed simple contact substances.

The effect of a catalyst is to accelerate the reaction and shorten the time of contact necessary thus reducing the size of plant necessary to handle a given amount of material. Such substances may therefore be employed with advantage in connection with atomic hydrogen in order to speed up the reactions, although their presence is not absolutely essential.

The quantity of catalyst required to promote the decomposition of sulphur compounds is so small that little or no hydrogenation of the oil therefrom takes place or, the absence of hydrogenation may be due to the poisoning effect of the sulphur. Although no substantial amount of hydrogenation can be looked for I have nevertheless found that unsaturated oils and other hydrocarbon products when treated in this manner give rise to stable products or become less unsaturated, due probably to polymerization which eliminates the gumming tendencies of such materials.

My invention in one of its more specific aspects comprises a reaction chamber wherein the dissociation of hydrogen is carried out by an electric arc, and atomic hydrogen is carried to the stream of hydrocarbon vapors by a current or blast of molecular hydrogen. Heat is also thus conveyed from the arc to the hydrocarbon vapors the amount of this heat and the temperature of the mixture being controlled by varying the ratio of hydrocarbon vapors in the mixture to the amount of hydrogen derived from the arc.

Other novel features of my invention will be described in the following specification. In the accompanying drawings, Figure 1—shows in vertical section a reaction chamber arranged for producing atomic hydrogen.

Figure 2—is a horizontal section of the same chamber on the line A—A, of Figure 1.

Figure 3—is a view in elevation of an electrode holder as used in connection with the reaction chamber.

Figure 4—illustrates in horizontal section the internal construction of the hollow cooled electrode used in this process.

Figure 5—is a detail of a part of the electrode shown in Figure 4.

Figure 6—illustrates a plant layout for utilizing this process.

The reaction chamber shown somewhat diagrammatically in Figures 1 and 2 comprises a steel shell 1, having a refractory lining 2, formed of a mixture of granular carbon and pitch such as is employed in lining electric furnaces. This lining is moulded into the form shown in the drawing, dried and finally calcined at high temperature to consolidate it into a hard monolithic refractory mass. A bottom 4, is riveted to the main shell and is lined with the same refractory material, as shown in the drawing. A removable cover 3, similarly lined is provided and is intended to be luted up gas tight by means of putty or some similar plastic refractory material. Circular openings and passages 5 and 6 are formed in the steel shell and the refractory lining to serve as inlet and outlet passages for the hydrocarbon vapors which find ingress and egress by means of pipes 7 and 8, bolted to the openings 5 and 6, of the shell.

The means illustrated whereby hydrogen is dissociated comprises arc supporting electrodes 9 and 10, held in metal electrode holders 11 and 12, which in turn are supported by bakelite insulating blocks 13 and 14, bolted to the shell of the reaction chamber by bolts 15, as shown. Electric current terminals 16 and 17, are attached to the electrode holders by tightening screws 18, which at the same time serve when screwed up to clamp the electrodes firmly in the holders. Figure 3, is an elevation of one of these electrode holders and clearly shows the method of construction and the assembly of parts relative to one another. A shank 19, on the holder is provided with a threaded end and has a nut 20, which is used to fix the holders firmly in place in the bakelite insulating blocks attached to the main shell.

The electrodes used with this apparatus are of metal and are internally cooled to prevent consumption of the refractory metal tips when operating the arc.

An illustrated section of one of these electrodes is shown in Figure 4. Referring to this figure it will be seen that the main body of the electrode is formed of a copper or steel tube 21, to which is detachably screwed a hollow cored head 22, of highly refractory metal such as tungsten, molybdenum, etc. These refractory metal heads are moulded, welded or otherwise integrally attached to a threaded hollow steel core or sleeve 23, which serves as means of attachment to the main body 21, of the electrode. This main body portion screws into a threaded T-shaped coupling 24, having a side outlet 25, and a threaded reducing outlet 26, into which screws a metal inlet pipe 27. The external diameter of this pipe 27, is considerably less than the internal diameter of the main body 21, so that between the two there is left an annular passage 28, to serve as an exit for fluid employed in cooling the electrodes.

The inlet pipe 27, extends into, but not quite to the end of the sleeve 23, of the refractory head, a small passageway being left sufficient to permit of the escape of liquid from the pipe 27, into the annular passage 28. In order to maintain the pipe 27, in spaced relationship to its surrounding parts the end of said pipe where extending into the refractory head is threaded as shown at 30, and a slotted washer or sleeve as shown in Figure 5, is screwed onto the threaded portion 30, so that the upstanding metal parts between the slots of the washer will serve as bearing elements for maintaining the pipe 27 in its proper position. The slots in the washer readily permit the passage of the cooling liquid to the passage 28, and the combination as a whole is easily removable as a single unit without dissembling.

Referring again to Figure 1, it will be seen that the electrodes 9 and 10, are each respectively insulated from the refractory carbon body of the reaction chamber, by soapstone or lava bushings 31 and 32, which are to be firmly bedded in the plastic carbon material when it is moulded in place. It will be noticed further that an open annular space 33 and 34 surrounds each electrode. These open spaces are intended to be luted up gas tight by means of putty, fire-clay, or some other type of suitable plastic material. In this case escape of vapors from around the electrodes is entirely prevented.

In order to provide for the introduction of hydrogen into the arc, there enters the reaction chamber through the removable cover and in line with, but above the arcing tips of the electrodes, a liquid cooled conduit 35, which is tipped by a nozzle 36, of refractory metal such as molybdenum. In order to cool the above conduit it is provided with a double concentric cooling jacket in order to force the flow of cooling liquid down close to the tip 36. Inlets and outlets 37 and 38, are provided for this fluid which is led to the conduits by flexible pipes.

An inspection passage outlined by a soapstone sleeve and closed by a glass covered spy hole 39, see Figure 2, permits an operator to at any time observe the condition of the arc by visual inspection.

In the type of apparatus illustrated in Figure 1, the arc is of the fixed electrode type, similar to the Birkeland-Eyde arc as employed in the production of nitric acid from atmospheric nitrogen. In this type of arc the electrodes do not waste away, or do so, so very slowly that adjustment of the electrodes is necessary only at long intervals of time. Thus with the Birkeland-Eyde arc employing cooled copper electrodes the arc has been operated in practice for periods of six weeks or more without adjustment. Employing cooled electrodes of refractory metals such as tungsten, molybdenum, etc., far longer periods of uninterrupted operation can be secured so that it can almost be said that electrode adjustment is eliminated altogether. However, the provision of the detachable electrode heads as provided for in this construction permits of easy electrode renewal at any time it may be necessary.

Arcs with cooled electrodes require very high current voltages to keep them in operation, this is particularly the case when such arcs are operated in hydrogen. For this and other reasons current voltages of 5000 volts and over are desirable, and from an operating point of view alternating current from a constant current transformer is preferable to direct current.

In the type of apparatus shown in the drawings the arc is intended to be started or set in operation by sparking across the electrodes with alternating current from a high tension transformer suitably connected to the circuit.

The means for accomplishing this, as well as the general layout and plan of plant operation of this process is illustrated in Figure 6. Referring to this figure, 40 and 41, are the power leads conveying current to the arc of the reaction chamber. In these leads is located the main power switch 42. An auto-transformer 43, connected across the leads is employed to furnish the high tension current necessary to start the main arc. This type of transformer is characterized by having its primary circuit included in a portion of its secondary circuit. Advantage is taken of this fact herein to so locate the starting switch 44, in the circuit that both primary and secondary circuits will be cut off from the main power circuit by one and the same operation of the switch. Thus in the figure, 45—45, are the low tension leads to the primary of the transformer, while 46—46, are the points of connection of the high tension leads to the main power circuit leading to the arc.

In putting the apparatus into operation it is necessary to thoroughly purge the reaction chamber of all oxygen containing gases before starting the arc. This is done by blowing into the reaction chamber through the conduit 35, a non-oxygen containing gas such as natural gas or other type of hydrocarbon gas. In Figure 6, the connection for this blow-out gas is clearly shown connected between the hydrogen generator and the reaction chamber; suitable control valves which are not shown in the figure should be provided to control the operation.

As the decomposition products of the organic sulphur compounds in the oil is mainly hydrogen sulphide, suitable means must be provided for removal of this gas. This is done by washing it from the condensed vapor by caustic soda solution, or it may be extracted direct from the vapor by means of an oxide of iron purifier, placed between the reaction chamber and the condenser, kept sufficiently warm to prevent condensation of the oil vapor in the purifier.

The periodic revivification of the catalytic iron oxide may be conducted by aeration in known manner.

In Figure 1, of the drawings there is shown at 47, a pool or layer of fused metal or alloy of tin and lead intended to serve as desulphurizing catalysts. These metals in the presence of hydrogen are strong catalysts for desulphurizing oils. The exit pipe 8, of the hydrocarbons, where it is connected to the reaction chamber should be heavily tinned on the inside to assist in the catalytic reduction.

Other catalysts some of which have been specified above may also be used, either alone or in combination with one another.

As a typical example of the application of this process as carried out in Figure 6, it may be assumed that crude oil is being distilled. The vapors from the head of the still are conducted at a temperature say of 400 degrees centigrade to the reaction chamber which has previously been purged of oxygen. The oil vapors enter the reaction chamber by the pipe 7, see Figure 1, and therein encounter and merge with a stream of hydrogen, preferably dried hydrogen, which has been directed through an arc operated between the electrodes of the reaction chamber. The stream of ordinary molecular hydrogen passing into contact with the car is dissociated into atomic hydrogen, the dissociation being accompanied by the absorption of heat from the arc. By regulating the relative rates of flow of the hydrocarbon and the atomic hydrogen from the arc, any temperature of reaction desired may be attained.

Contact of the atomic hydrogen with the sulphur compounds in the oil brings about their instant reduction to hydrogen sulphide, and this reaction will take place in the cold if necessary, but is of course accelerated by heat.

The presence of a catalyst is not essential to effect this reduction, but as the presence of such an element speeds up the reaction and permits of obtaining higher outputs with the use of lower temperatures its use seems desirable where possible.

As the quantity of atomic hydrogen produced is purely a function of the amount of power put into the arc it is self evident that the desulphurizing action may be made as great as desired, and arcs consuming hundreds of kilowatts may be used when necessary.

In operation the electrodes remain substantially intact, or in other words, are not consumed by the arc.

In starting the arc the main switch 42, is first closed and then the starting switch 44, is temporarily closed and as soon as the arc starts is immediately reopened so as to cut the high tension transformer entirely out of the circuit, after which it will be found that the normal supply voltage will be sufficient to keep the arc alight. Should the arc at any time go out it can be instantly restarted by operating the starting switch as above described. To extinguish the arc the main power switch 42, is opened thus cutting off the main current supply.

The hydrocarbon vapors after treatment with atomic hydrogen pass to a condenser where they are reduced to liquids and the condensate so produced is then transferred to the treating tank wherein the absorbed hydrogen sulphide in the oil is removed, after which the mixture of oils and washing liquids pass to a separating tank wherein the oil is separated and is then transferred to the finished stock tank for storage. This is all clearly outlined in Figure 6, and can easily be understood by inspection of the drawing.

While the use of this process has been explained in connection with the treatment of the oil while in the vapor phase, it may be as effectually used, and in some cases with better results, where the treatment takes place while the hydrocarbon material is in the liquid phase. Further, the addition of heat, even in the liquid phase, may increase materially the rate of reaction of the atomic hydrogen.

One other point to which attention may be directed is, that whatever type of liquid is employed for cooling the electrodes of the arc, it should be a non-conductor of electricity, and for most purposes oil seems to be the most suitable material.

In order to convey the cooling liquid to the electrodes flexible pipes formed of leather should be used, as rubber is destroyed by contact with oil. Flexible metallic pipes may be used if they are insulated from the electrode by bakelite sleeves.

Having thus described this invention and the best means known to me of carrying the same into practical effect, what I claim is:—

1. A process for eliminating sulphur from hydrocarbons which consists in bringing the hydrocarbons into intimate contact with a gaseous mixture one of the elements of which consists of atomic hydrogen, which latter has been separately produced by subjecting a dry gas including hydrogen in its composition to the electrifying influence of a high-tension electrical arc, the reaction between the hydrocarbons and said atomic hydrogen being effective in a zone adjacent to but out of the direct electrical influence of said arc, and in the presence of a catalytic agent adapted to accelerate the formation of sulphureted hydrogen from the sulphur of the oils, and then removing the sulphureted hydrogen from the oil.

2. A process for eliminating sulphur from hydrocarbons which consists in bringing the vapor of the hydrocarbon into intimate contact with a proportion of atomic hydrogen in excess of the amount of sulphur present in the oil, which atomic hydrogen has been separately produced by subjecting a dry gas including hydrogen in its composition to the electrifying influence of a high-tension electrical arc, the reaction between the hydrocarbons and said atomic hydrogen being effective in a zone adjacent to but out of the direct electrical influence of said arc, heating the mixture to accelerate the decomposition of the sulphur compounds into sulphureted hydrogen, and then removing the sulphureted hydrogen from the hydrocarbon.

3. A process for eliminating sulphur from hydrocarbons which consists in bringing the vapor of the hydrocarbons into intimate contact with a gaseous mixture containing as one of its elements a proportion of atomic hydrogen in excess of the amount of sulphur present in the oil, which atomic hydrogen has been separately produced by subjecting a dry gas including hydrogen in its composition to the electrifying influence of a high-tension electrical arc, the reaction between the hydrocarbons and said atomic hydrogen being effective in a zone adjacent to but out of the direct electrical influence of said arc, heating the mixture in the presence of a catalyst having an affinity for sulphur and which is adapted to accelerate the decomposition of the sulphur compounds of the hydrocarbon into sulphureted hydrogen, and then removing the sulphureted hydrogen from the hydrocarbon.

4. In the process of improving hydrocarbons, the steps which consist in bringing the hydrocarbons to be treated into intimate contact with substantially dry, oxygen-free electrified atomic hydrogen previously produced in an electric arc and effecting the reaction therebetween in a zone out of the direct influence of said arc.

5. A process for eliminating sulphur from hydrocarbons, which consists in first producing a substantially dry, atomic hydrogen by subjecting dry gas containing hydrogen in its composition and substantially free from oxygen to the action of a high-tension electric arc in order to produce atomic hydrogen and immediately causing the sulphur-bearing hydrocarbons to be treated to react with such atomic hydrogen in proximity to, but out of direct electrifying influence of, said arc and while supplying heat to the mixture whereby hydrogen sulphide is formed and then separately recovering hydrogen sulphide and the resultant hydrocarbons from the mixture.

DONALD L. THOMAS.